United States Patent
Gauthier et al.

(10) Patent No.: US 7,069,459 B2
(45) Date of Patent: Jun. 27, 2006

(54) CLOCK SKEW REDUCTION TECHNIQUE BASED ON DISTRIBUTED PROCESS MONITORS

(75) Inventors: Claude R. Gauthier, Cupertino, CA (US); Shaishav Desai, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 10/385,414

(22) Filed: Mar. 10, 2003

(65) Prior Publication Data

US 2004/0181705 A1  Sep. 16, 2004

(51) Int. Cl.
*G06F 1/12* (2006.01)

(52) U.S. Cl. .................. 713/401; 713/503

(58) Field of Classification Search ........... 713/400, 713/401, 500, 503
See application file for complete search history.

(56) References Cited

U.S. PATENT DOCUMENTS

| | | | |
|---|---|---|---|
| 6,029,251 A * | 2/2000 | Williams et al. ........... 713/501 |
| 6,181,556 B1 * | 1/2001 | Allman ..................... 361/690 |
| 6,421,626 B1 * | 7/2002 | Yin .......................... 702/132 |
| 6,897,699 B1 * | 5/2005 | Nguyen et al. ............ 327/295 |
| 6,900,721 B1 * | 5/2005 | Urbas et al. .............. 340/10.51 |
| 6,922,112 B1 * | 7/2005 | Kurd et al. ................ 331/57 |

OTHER PUBLICATIONS

Stinson et al.; "14.4 A 1.5GHz Third Generation Itanium® Processor"; International Solid State Circuits Conference, 2003, Session 14/Mircoprocessor/Paper 14.4, Feb. 11, 2003; 6 pgs.

* cited by examiner

*Primary Examiner*—Thomas Lee
*Assistant Examiner*—Mark Connolly
(74) *Attorney, Agent, or Firm*—Osha Liang LLP

(57) ABSTRACT

A method and apparatus for adjusting clock skew involves using a plurality of oscillators distributed across the apparatus where at least one of the plurality of oscillators has a frequency dependent on a characteristic of the apparatus. A processor is arranged to adjust a bias generator dependent on the frequency. The bias generator is arranged to adjust a delay through a tunable buffer. The tunable buffer is arranged to propagate a clock signal dependent on the adjustment of the delay through the tunable buffer dependent on the bias generator.

19 Claims, 8 Drawing Sheets

CLOCK SKEW REDUCTION TECHNIQUE BASED ON DISTRIBUTED PROCESS MONITORS

BACKGROUND OF THE INVENTION

As shown in FIG. 1, a typical computer system (10) has, among other components, a microprocessor (12), one or more forms of memory (14), integrated circuits (IC) (16) having specific functionalities, and peripheral computer resources (not shown), e.g., monitor, keyboard, software programs, etc. These components communicate with one another via communication paths (19), e.g., wires, buses, etc., to accomplish the various tasks of the computer system (10).

In order to properly accomplish such tasks, the computer system (10) relies on the basis of time to coordinate its various operations. To that end, a crystal oscillator (18) generates a system clock signal (referred to and known in the art as "reference clock signal" and shown in FIG. 1 as SYS_CLK) to various parts of the computer system (10). Modern microprocessors and other integrated circuits, however, are typically capable of operating at frequencies significantly higher than the system clock signal, and thus, it becomes important to ensure that operations involving the microprocessor (12) and the other components of the computer system (10) use a proper and accurate reference of time.

One component used within the computer system (10) to ensure a proper reference of time among the system clock signal and a microprocessor clock signal, i.e., "chip clock signal" or CHIP_CLK, is a type of clock generator known as a phase locked loop (PLL) (20). The PLL (20) is an electronic circuit that controls an oscillator such that the oscillator maintains a constant phase relative to the system clock signal. Referring to FIG. 1, the PLL (20) has as its input the system clock signal, which is its reference clock signal, and outputs a chip clock signal (shown in FIG. 1 as CHIP_CLK) to the microprocessor (12). The system clock signal and chip clock signal have a specific phase and frequency relationship controlled by the PLL (20). This relationship between the phase and frequency of the system clock signal and chip clock signal ensures that the various components within the microprocessor (12) use a controlled and accounted for reference of time. When this relationship is not maintained by the PLL (20), however, the operations within the computer system (10) become non-deterministic.

FIG. 2 shows a block diagram of a typical phase locked loop and buffered clock tree (200). The phase locked loop (202) receives a clock signal from clock path (201). The phase locked loop (202) outputs a clock signal on clock path (203). The clock signal on clock path (203) may have an increased frequency compared to the frequency of the clock signal on clock path (201). The phase locked loop (202) drives the clock signal on clock path (203) so that the clock signal on clock path (203) may connect to other circuits using the buffered clock tree (200).

The buffered clock tree (200) includes many buffers (230, 232, 234, 236, 238, 240, 242, 244, 246, 248, 250) to propagate and amplify the clock signal on clock path (203). The buffers (230, 232, 234, 236, 238, 240, 242, 244, 246, 248, 250) may be distributed across a microprocessor (e.g., microprocessor (12) shown in FIG. 1). The phase locked loop (202) receives an input clock signal from part of the buffered clock tree (200) formed by the clock signal on clock path (203). Accordingly, the phase locked loop (202) may adjust the timing and frequency of the clock signal on clock path (203) to compensate for some of the effects caused by the buffers (230, 232, 234, 236, 238, 240, 242, 244, 246, 248, 250).

A delay, or clock skew, on different branches of the buffered clock tree (200) may vary. Clock skew can be defined as the difference in time between an edge of a clock signal at two different locations in the integrated circuit. Furthermore, clock skew may also account for differences in edge transition rates of a signal in addition to propagation delays. The clock skew may be caused, for example, by different impedances, voltages, process variations, and temperatures. Variations in clock skew are typically accounted for in a microprocessor (e.g., microprocessor (12) shown in FIG. 1) design. As a microprocessor (e.g., microprocessor (12) shown in FIG. 1) clock frequency increases, an acceptable margin for clock skew decreases.

FIG. 3 shows an exemplary thermal profile (300) of an integrated circuit (e.g., microprocessor (12) shown in FIG. 1). The thermal profile (300) has several local hot spots (310) where more heat is generated than other locations on the integrated circuit. The hot spots (310) may have different temperatures, different sizes, different locations, and different effects on local circuits. Furthermore, the hot spots (310) may change location based on the activities of the integrated circuit. Accordingly, the clock skew of the buffers (230, 232, 234, 236, 238, 240, 242, 244, 246, 248, 250 shown in FIG. 2) in the buffered clock tree (200 shown in FIG. 2) may be affected by the temperature differences across a microprocessor (e.g., microprocessor (12) shown in FIG. 1).

SUMMARY OF THE INVENTION

According to one aspect of one or more embodiments of the present invention, an apparatus comprising a plurality of oscillators distributed across the apparatus where at least one of the plurality of oscillators has a frequency dependent on a characteristic of the apparatus; a first tunable buffer arranged to propagate a first clock signal; a first bias generator arranged to adjust a propagation delay through the first tunable buffer; and a processor arranged to adjust the first bias generator dependent on the frequency.

According to another aspect of one or more embodiments of the present invention, a method comprising generating a plurality of oscillator signals at a plurality of locations on an integrated circuit where a frequency of at least one of the plurality of oscillator signals is dependent on a characteristic of the integrated circuit; monitoring the at least one of the plurality of the oscillator signals; determining an adjustment of a propagation delay through a first tunable buffer dependent on the monitoring; and adjusting the propagation delay through the first tunable buffer dependent on the determining.

According to another aspect of one or more embodiments of the present invention, an apparatus comprising means for generating a plurality of oscillator signals where the oscillator signals are generated at a plurality of locations distributed across the apparatus and where a frequency of at least one of the plurality of oscillator signals is dependent on a characteristic of the apparatus; means for monitoring the at least one of the plurality of the oscillator signals; means for buffering a clock signal; means for determining an adjustment of a propagation delay through the means for buffering dependent on the means for monitoring; and means for adjusting the propagation delay through the means for buffering dependent on the means for determining.

DETAILED DESCRIPTION

Embodiments of the present invention relate to a method and apparatus to adjust one or more tunable buffers to reduce clock skew. A plurality of oscillators may be distributed across the apparatus, where at least one of the plurality of oscillators has a frequency dependent on a characteristics of the apparatus. The frequency may be used to adjust the one or more tunable buffers. Accordingly, the clock skew may be reduced.

Figure 1:
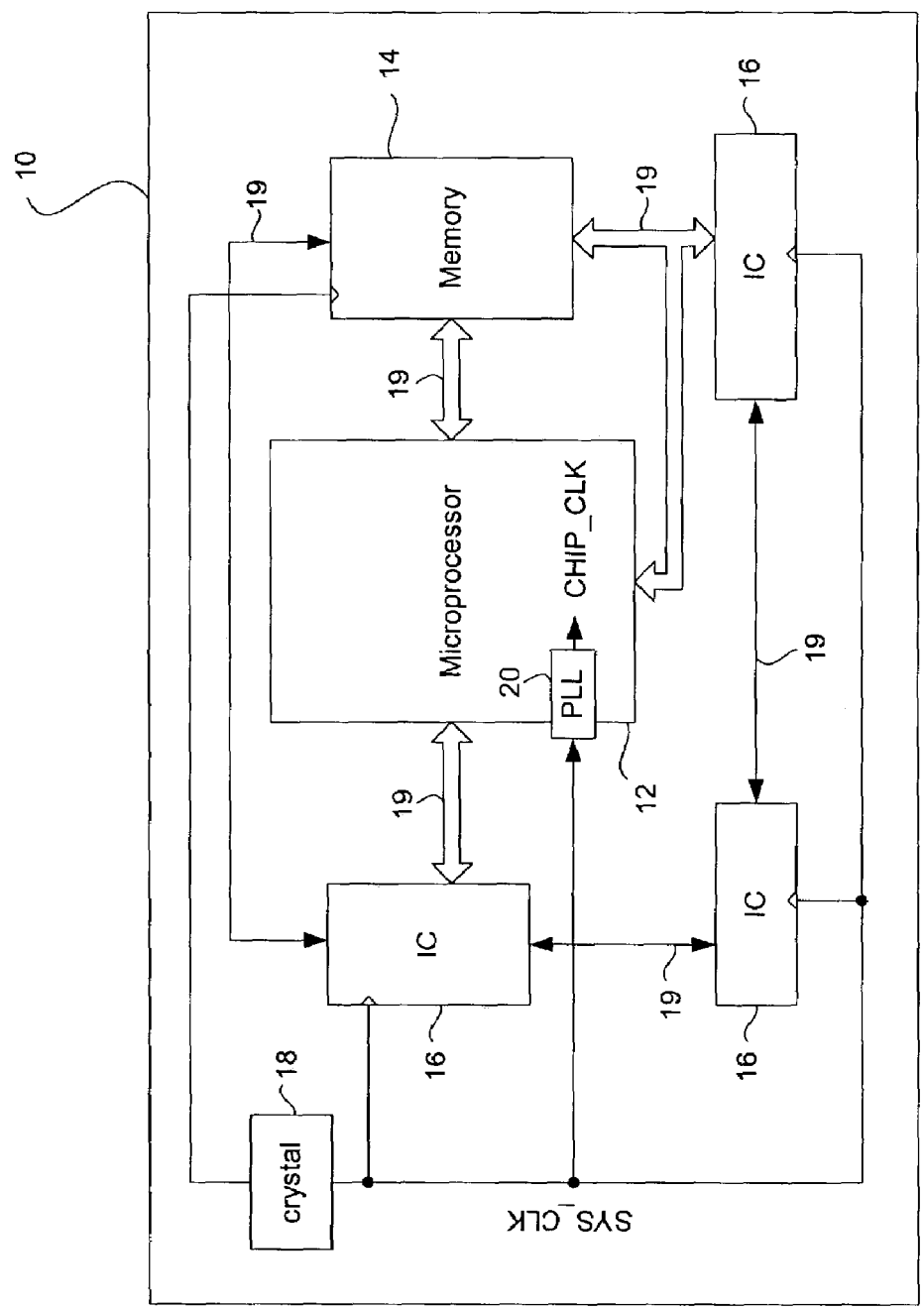
FIG. 1 shows a block diagram of a typical computer system.
Figure 2:
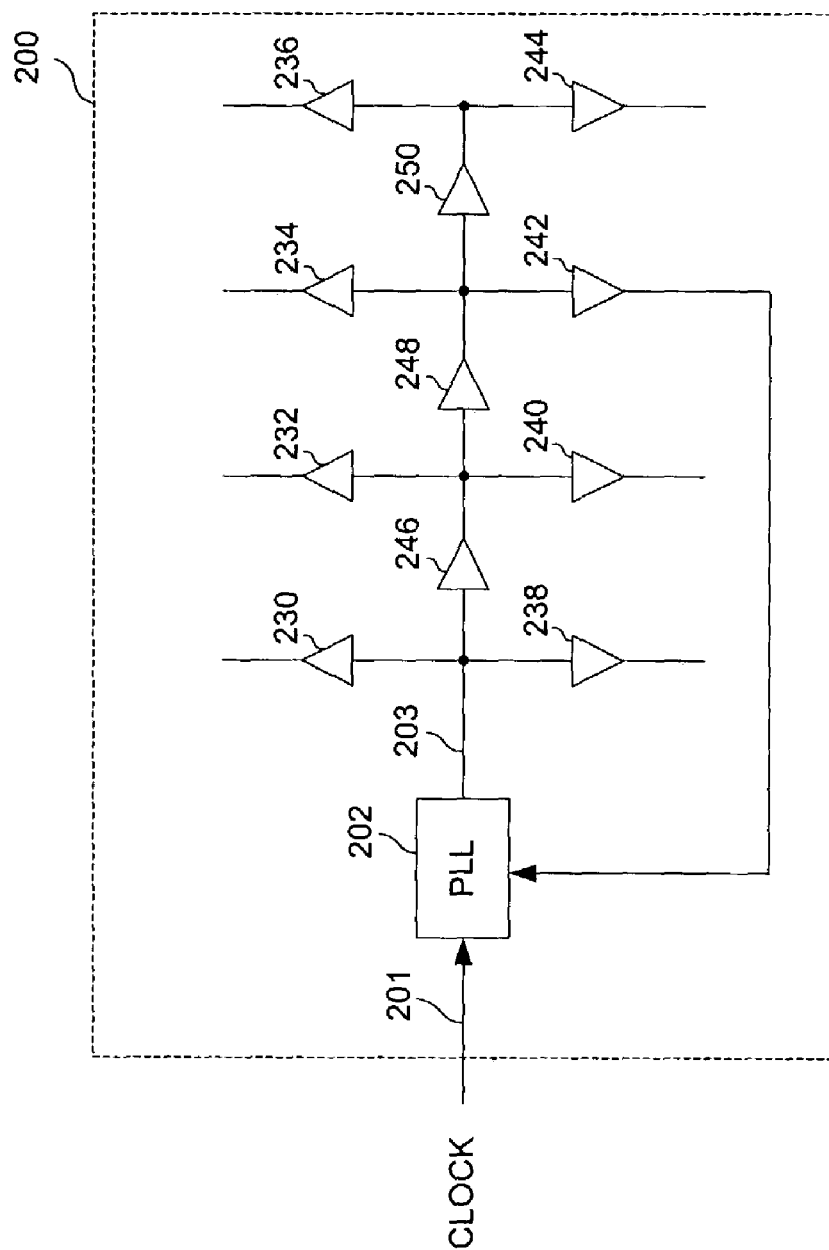
FIG. 2 shows a block diagram of a typical phase locked loop and buffered clock tree.
Figure 3:
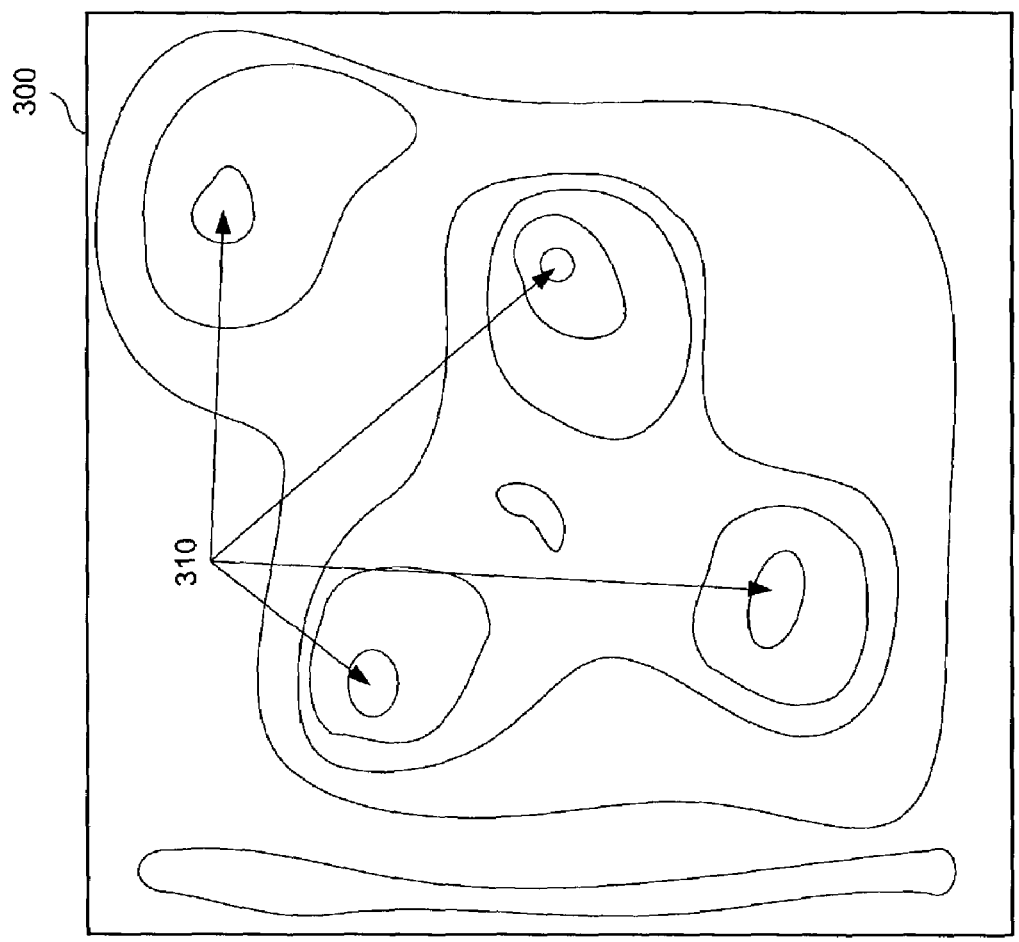
FIG. 3 shows an exemplary thermal profile of an integrated circuit.
Figure 4:
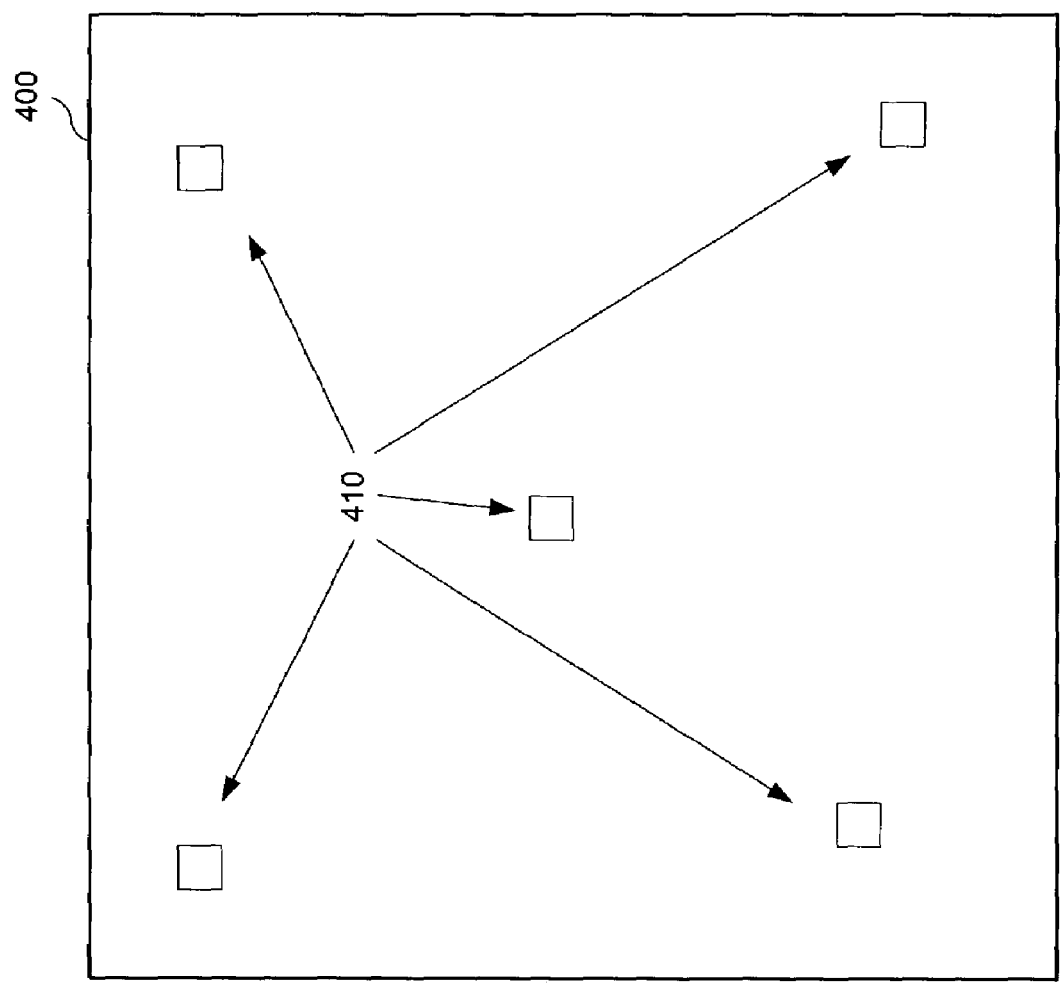
FIG. 4 shows a block diagram of an integrated circuit with a plurality of oscillators in accordance with an embodiment of the present invention.

FIG. 4 shows a block diagram of an exemplary integrated circuit (400) with a plurality of oscillators (410) in accordance with an embodiment of the present invention. The oscillators (410) may be distributed across the integrated circuit (400). The oscillators (410) may oscillate at a frequency that is dependent on a characteristic of the integrated circuit (400). A characteristic of the integrated circuit (400) may include a temperature, voltage, and/or process of the integrated circuit (400) at a location of the oscillators (410). Accordingly, the oscillators (410) may indicate a characteristics of the integrated circuit (400) local to the oscillators (410).

One of ordinary skill in the art will understand that one, or more than one, oscillators may be used on the integrated circuit (400). Also, the oscillators (410) may be arranged in a desired pattern, such as on regions where a temperature may increase more than other regions (i.e., hot spot) and/or regions where a temperature shift may have a greater effect on the operation of the integrated circuit (400). Furthermore, the oscillators (410) may be arranged in a grid pattern.

Figure 5:
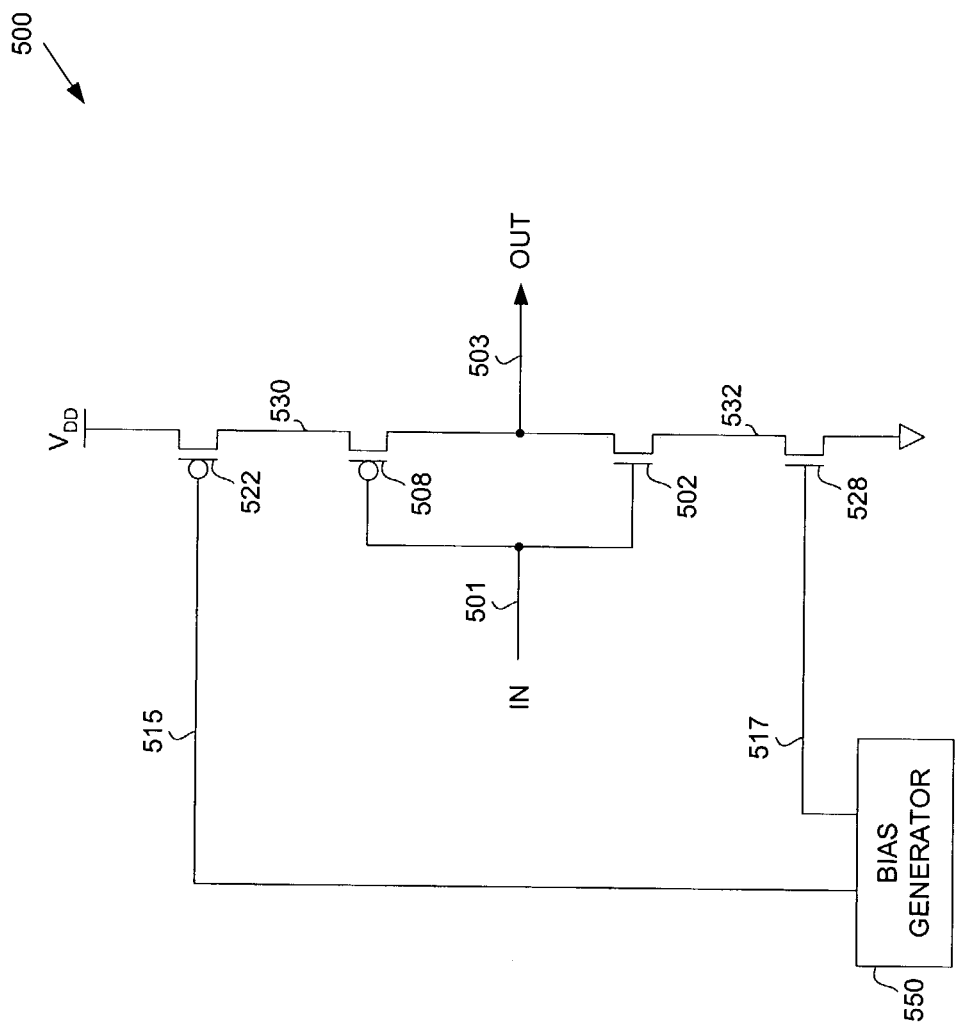
FIG. 5 shows a schematic diagram of a tunable buffer system in accordance with an embodiment of the present invention.

FIG. 5 shows a schematic diagram of an exemplary tunable buffer system (500) in accordance with an embodiment of the present invention. The tunable buffer includes transistors (522, 508, 502, 528). A bias voltage on paths (515, (17) control a current through the tunable buffer. Accordingly, the current from a power supply VDD available on path (530) and the current from a power supply $V_{SS}$ on path (532) may be controlled. The transistors (508, 502) form an inverter structure. In other words, if an input signal (501) has a high voltage potential, transistor (502) is "on," and transistor (508) is "off," which, in turn, leads to an output signal (503) having a low voltage potential. Conversely, if the input signal (01) has a low voltage potential, transistor (502) is "off," and transistor (508) is "on," which, in turn, leads to the output signal (503) having a high voltage potential.

The transistors (522, 528) control a rate of transition between the low voltage potential and high voltage potential, and vice versa. Accordingly, if the input signal (501) is a clock signal, a delay of the clock signal may be controlled. Such control of the clock signal may facilitate the reduction of clock skew with respect to the receipt of the clock signal at other locations.

A bias generator (550) controls the bias voltage on paths (515, 517). A change in the bias voltage on either path (515, 517) may change a delay of a clock signal through the tunable buffer.

Figure 6:
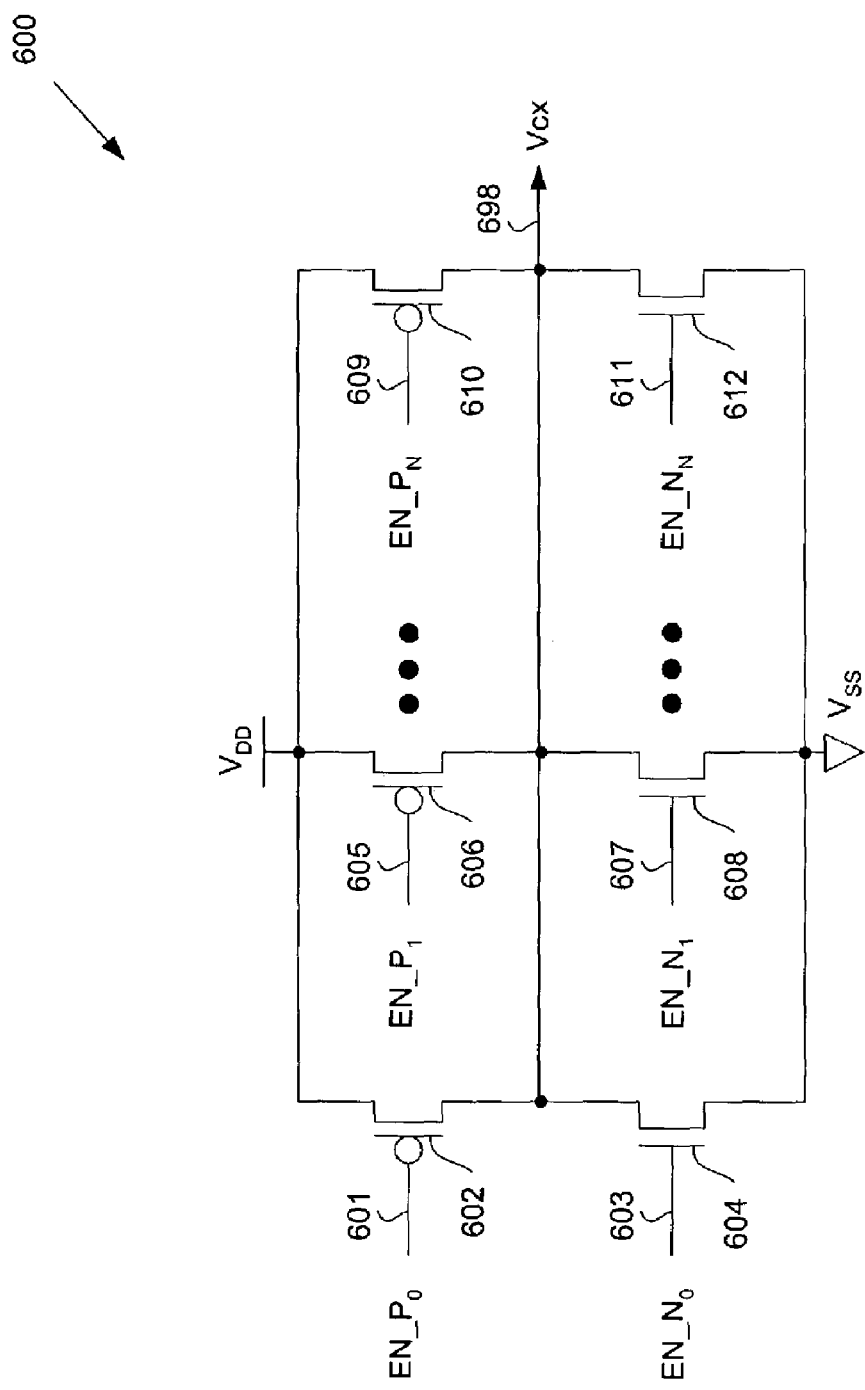
FIG. 6 shows a schematic diagram of a bias generator in accordance with an embodiment of the present invention.

FIG. 6 shows a schematic diagram of an exemplary bias generator (600) in accordance with an embodiment of the present invention. In FIG. 6, the bias generator (600) includes p-channel transistors (602, 606, and 610) arranged in parallel with each other. The p-channel transistors (602, 606, and 610) connect between a power supply, Vdd, and a common node, Vcx (698). The common node Vcx (698) provides a biasing signal, e.g., biasing signal (515) shown in FIG. 5. The bias generator (600) also includes n-channel transistors (604, 608, and 612) arranged in parallel with each other. The n-channel transistors (604, 608, and 612) connect between ground, Vss, and the common node, Vcx (698). The p-channel transistors (602, 606, and 610) are controlled by control signals $EN\_P_0$ (601), $EN\_P_1$ (605), and $EN\_P_N$ (609), respectively. The n-channel transistors (604), (608), and (612) are controlled by control signals $EN\_N_0$ (603), $EN\_N_1$ (607), and $EN\_N_N$ (611), respectively. A low voltage on any of the EN_P signals (601, 605, and 609) will turn "on" their respective p-channel transistors (602, 606, and 610). A high voltage on any of the EN_N signals (603, 607, and 611) will turn "on" their respective n-channel transistors (604, 608, and 612).

Any p-channel transistor (602, 606, and 610) that is "on" will have a tendency to increase the voltage on Vcx (698) toward Vdd. Any n-channel transistor (604, 608, and 612) that is "on" will have a tendency to lower the voltage on Vcx (698) toward Vss. By selecting which p-channel transistors (602, 606, and 610) and/or n-channel transistors (604, 608, and 612) are "on," a change in the voltage on Vcx (698) may be achieved.

One of ordinary skill in the art, having benefit of the present invention, will understand that the p-channel transistors (602, 606, and 610) and n-channel transistors (604, 608, and 612) may be turned "on" individually or as a group. The p-channel transistors (602, 606, and 610) and n-channel transistors (604, 608, and 612) may be sized so that each transistor has a different effect as compared to the other transistors, e.g., a transistor's gate width may be varied to adjust the strength of the transistor. The gate widths may be designed to provide a linear, exponential, or other function as more transistors are turned "on." The p-channel transistors (602, 606, and 610) and n-channel transistors (604, 608, and 612) may be sized so that each transistor has an inherently resistive nature, e.g., a transistor's gate length may be increased (long-channel transistors) to increase the inherent resistance of the transistor. A larger inherent resistance may be advantageous if both a p-channel transistor and a n-channel transistor are "on" simultaneously. In other embodiments, the bias generator (600) may include only one p-channel transistor and one n-channel transistor connected in series.

Those skilled in the art will appreciate that by selectively controlling the bias generator, the bias generator may be used to adjust a particular bias signal, e.g., bias signal (515 and 517) shown in FIG. 5, within a tunable buffer, thereby adjusting current and resistive properties of particular circuitry within the tunable buffer in order to attain a desired propagation delay of a signal responsive to the particular circuitry.

Figure 7:
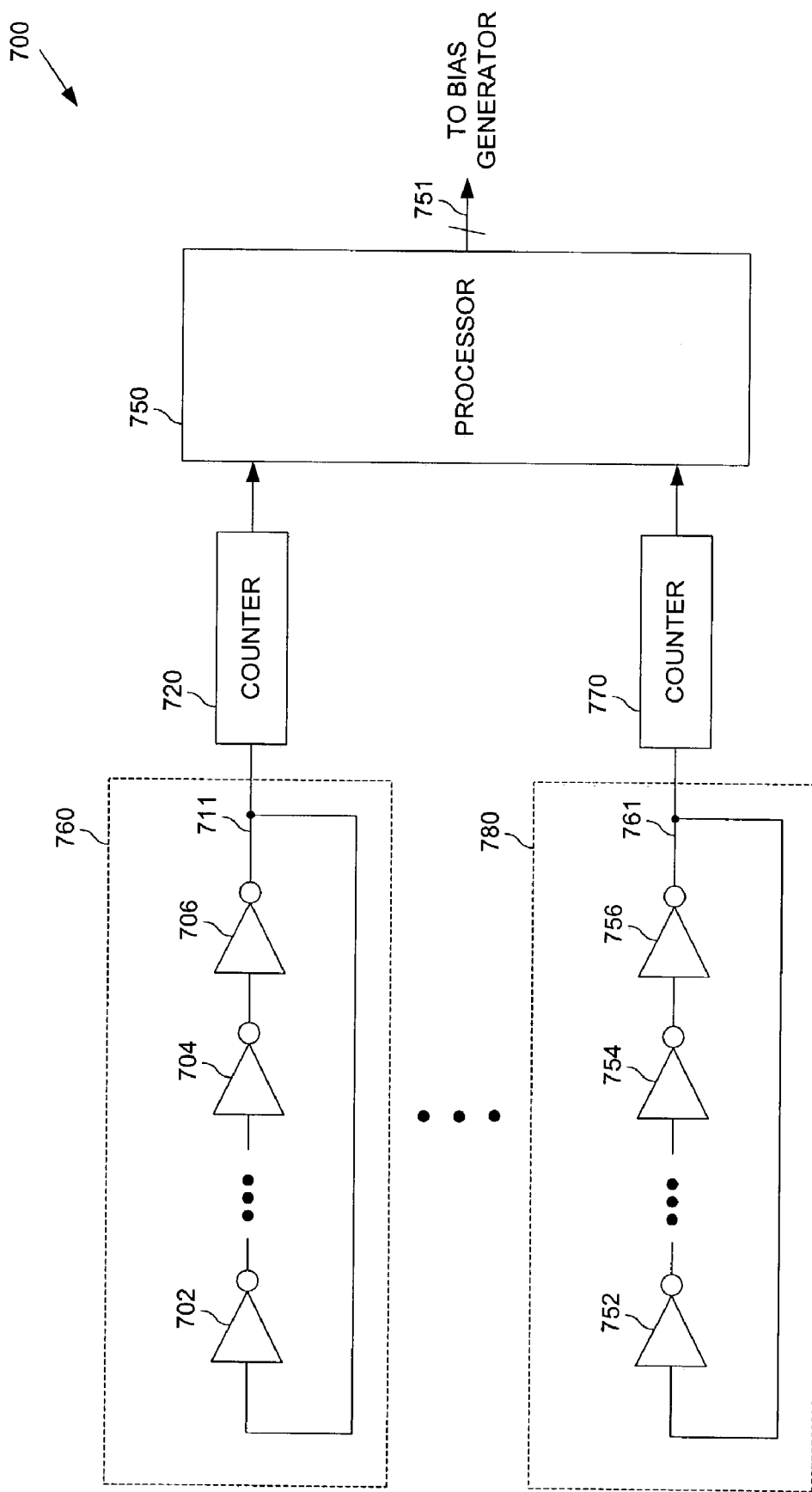
FIG. 7 shows a block diagram of a bias generator adjustment arrangement in accordance with an embodiment of the present invention.

FIG. 7 shows a block diagram of an exemplary bias generator adjustment arrangement (700) in accordance with an embodiment of the present invention. The exemplary bias generator adjustment arrangement (700) includes a plurality of oscillators (760 and 780), counters (720 and 770), and a processor (750). The oscillator (760) is, specifically, a ring oscillator, which includes an odd number of inverters (702, 704, 706). The odd number of inverters (702, 704, 706) are connected in a ring using feedback path (711). The frequency of the oscillator (760) is dependent on a number or inverters (702, 704, 706) in the ring. One of ordinary skill in the art will understand that other types of oscillators are available.

Similarly, the oscillator (780) is, specifically, a ring oscillator, which includes an odd number of inverters (752, 754, 756). The odd number of inverters (752, 754, 756) are connected in a ring using feedback path (761). The frequency of the oscillator (780) is dependent on a number or inverters (752, 754, 756) in the ring. One of ordinary skill in the art will understand that other types of oscillators are available.

The counters (720 and 770) are arranged to receive an output from oscillators (760 and 780), respectively. The counters (720 and 770) may count a number of clock cycles to indicate a frequency of the oscillators (760 and 780). For example, the counters (720 and 770) may count a number of clock cycles that occur in a desired time period. Equally, the counters (720 and 770) may count a desired number of clock cycles. The time required to reach the desired count may be used to indicate a frequency of the oscillators (760 and 780). One of ordinary skill in the art will understand that other counting arrangements are possible.

The counters (720 and 770) indicate a frequency to the processor (750).

The processor (750) may receive a count from counters (720 and 770), in which case, the processor (750) may have to perform some calculations to determine the frequency. The processor (750) may receive a value representative of the frequency directly from each counter (720 and 770), in which case, no additional processing may be required.

The processor (750) having received a value indicating a frequency, or processed the count to determine a frequency, may determine an adjustment for at least one bias generator using path (751). Adjusting at least one bias generator (550 in FIG. 5) enables an adjustment to at least one tunable buffer (500 in FIG. 5). By adjusting at least one tunable buffer, a clock skew may be reduced. The processor may adjust the control signals EN_N (603, 607, and 611 shown in FIG. 6) and control signals EN_P (601, 605, and 609 shown in FIG. 6). The control signals EN_N (603, 607, and 611 shown in FIG. 6) and control signals EN_P (601, 605, and 609 shown in FIG. 6) may be controlled, directly or indirectly, by the processor (750).

Figure 8:
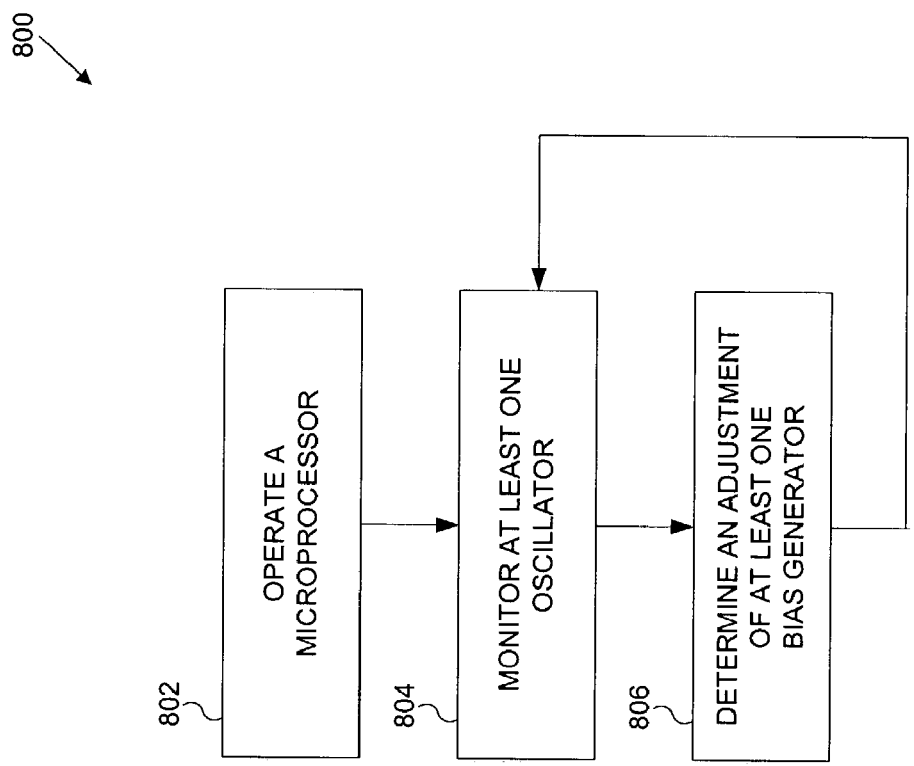
FIG. 8 shows a flow diagram of a clock skew adjustment system in accordance with an embodiment of the present invention.

FIG. 8 shows an exemplary flow diagram (800) of a clock skew adjustment system in accordance with an embodiment of the present invention. A microprocessor (e.g., integrated circuit (400) in FIG. 4) is operated and a plurality of oscillators (e.g., oscillators (410) in FIG. 4) distributed on the microprocessor are operated (step 802). Accordingly, the plurality of oscillators (e.g., oscillators (410) in FIG. 4) have a frequency of oscillation. At least one of the plurality of oscillators (e.g., oscillators (410) in FIG. 4) has a frequency dependent on a characteristic of the microprocessor, where the characteristic includes a temperature, a voltage, and/or a process. At least one of the plurality of oscillators (e.g., oscillators (410) in FIG. 4) is monitored (step 804). For example, a processor (e.g., processor (750) shown in FIG. 7) monitors the frequency generated by at least one of the plurality of oscillators.

Because the locations of the plurality of oscillators (e.g., oscillators (410) in FIG. 4) and a location of a tunable buffer on the microprocessor (e.g., integrated circuit (400) in FIG. 4) are known, an effect of the characteristic on the tunable buffer may be determined. Accordingly, a bias generator is adjusted to offset the effect of the characteristic on clock skew dependent on the monitoring (step 806). The bias generator adjusts a tunable buffer.

One of ordinary skill in the art, having benefit of this disclosure, will understand that one or more of the plurality of oscillators may be monitored, and one or more tunable buffers may be included on the microprocessor. Also, obtaining a frequency value from the one or more of the plurality of oscillators may be accomplished through a wide variety of means. Furthermore, the processor (e.g., processor (750) shown in FIG. 700) may used a variety of algorithms to adjust a bias generator.

Advantages of the present invention may include one or more of the following. In one or more embodiments, a plurality of oscillators have a frequency that may be used to adjust a bias generator, which may adjust a tunable buffer. Accordingly, a characteristic of a region of a microprocessor may be known. Furthermore, the effect of the characteristic on clock skew may be offset using a tunable buffer. Additionally, in one or more embodiments, because a tunable buffer is adjusted to reduce clock skew, a margin needed to account for clock skew may be reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
    a plurality of oscillators distributed across the apparatus, wherein at least one of the plurality of oscillators has a frequency dependent on a characteristic of the apparatus;
    a first tunable buffer arranged to propagate a first clock signal;
    a processor arranged to output at least one control signal dependent on the frequency; and
    a first bias generator arranged to adjust a propagation delay through the first tunable buffer dependent on the at least one control signal, wherein a propagation delay through at least one other tunable buffer is not dependent on the at least one control signal.

2. The apparatus of claim 1, further comprising a counter, wherein the counter is arranged to count a number of clock cycles generated by at least one of the plurality of oscillators, and wherein the counter is operatively connected to the processor.

3. The apparatus of claim 1, wherein the characteristic of the apparatus is selected from at least one of a temperature, a voltage, and a process.

4. The apparatus of claim 1, wherein the first tunable buffer is arranged within a clock tree.

5. The apparatus of claim 1, wherein the plurality of oscillators are arranged in a grid pattern.

6. The apparatus of claim 1, wherein the at least one of the plurality of oscillators is located on a hot spot.

7. The apparatus of claim 1, wherein at least one of the plurality of oscillators comprises a ring oscillator.

8. The apparatus of claim 1, wherein the first bias generator comprises a plurality of transistors arranged to adjust a bias voltage, and wherein a delay through the first tunable buffer is dependent on the bias voltage.

9. The apparatus of claim 1, wherein the first tunable buffer comprises a device that control a rate of transition of a propagation of the first clock signal.

10. The apparatus of claim 1, further comprising:
    a second tunable buffer arranged to propagate a second clock signal; and
    a second bias generator arranged to adjust a propagation delay through the second tunable buffer, wherein the second bias generator is adjustable dependent on the frequency.

11. The apparatus of claim 10, wherein the second tunable buffer is arranged within a clock tree.

12. A method, comprising:
    generating a plurality of oscillator signals at a plurality of locations on an integrated circuit, wherein a frequency of at least one of the plurality of oscillator signals is dependent on a characteristic of the integrated circuit;
    monitoring the at least one of the plurality of the oscillator signals;
    determining an adjustment of a propagation delay through a first tunable buffer dependent on the monitoring;
    generating at least one control signal dependent on the determining; and
    adjusting the propagation delay through the first tunable buffer dependent on the at least one control signal, wherein a propagation delay through at least one other tunable buffer is not dependent on the at least one control signal.

13. The method of claim 12, wherein the monitoring comprises:
    counting a number of clock cycles of the at least one of the plurality of oscillator signals, wherein the determining is dependent on the counting.

14. The method of claim 12, wherein the characteristic of the integrated circuit is selected from at least one of a temperature, a voltage, and a process.

15. The method of claim 12, further comprising:
    inputting a clock signal at an input of the first tunable buffer; and
    distributing the clock signal from the first tunable buffer across the integrated circuit.

16. The method of claim 12, wherein the at least one of the plurality of oscillator signals is dependent on a hot spot of the integrated circuit.

17. The method of claim 12, wherein the generating comprises using a ring oscillator.

18. The method of claim 12, wherein the adjusting comprises generating a bias voltage, wherein the propagation delay through the first tunable buffer is dependent on the bias voltage.

19. The method of claim 12, further comprising:
    determining an adjustment of a propagation delay through a second tunable buffer dependent on the monitoring; and
    adjusting the propagation delay through the second tunable buffer dependent on the determining.
    determining an adjustment of a second tunable buffer dependent on the monitoring; and
    adjusting the second tunable buffer dependent on the determining.

* * * * *